Oct. 18, 1960

I. R. BARR ET AL 2,956,477

BOMB RACK

Filed June 23, 1953

IRWIN R. BARR
JOSEPH F. MALONEY
ROBERT L. ZOUCK
INVENTORS

BY *Billy G. Corber*

IRWIN R. BARR
JOSEPH F. MALONEY
ROBERT L. ZOUCK
INVENTORS

BY Billy G. Corber

United States Patent Office 2,956,477
Patented Oct. 18, 1960

2,956,477

BOMB RACK

Irwin R. Barr, Kingsville, Joseph F. Maloney, Towson, and Robert L. Zouck, Pikesville, Md., assignors to Aircraft Armaments, Inc., Baltimore, Md., a corporation of Ohio Filed June 23, 1953, Ser. No. 363,536

4 Claims. (Cl. 89—1.5)

This invention relates to release mechanisms and more particularly to a rack for supporting heavy objects such as bombs on aircraft.

The conventional types of aircraft bomb racks ordinarily employ levers and toggle linkages which lock in a past dead center position to support the bomb. The release mechanisms associated with such racks, usually have a friction arrangement having a fixed mechanical advantage, cause the toggle lock to swing to the other side of the dead center position for dropping the bomb. A bomb rack designed on these principles for supporting a relatively heavy bomb becomes quite complicated and bulky if the force required to actuate the release mechanism is to be maintained at a reasonable value. Also, such bomb racks are not adaptable for use with different sized bombs; that is, a conventional rack designed for carrying a heavy bomb will not function properly when carrying a light bomb.

As set forth in the following statement of the objects, this invention overcomes the disadvantages enumerated above in connection with conventional bomb racks and provides a rack particularly well suited for use in the wings of aircraft for carrying exteriorly mounted bombs.

An object of this invention is to provide a bomb rack of simple design and which occupies a minimum of space.

Another object of this invention is to provide a bomb rack having a release mechanism which may be actuated to release a bomb by a small and nearly constant force irrespective of the bomb weight.

Another object of this invention is to provide a bomb rack having positive locking means for effectively maintaining the rack in the bomb holding position.

Still another object of this invention is to provide a bomb rack having means for insuring positive release of the bomb upon actuation of the release mechanism.

Further and other objects will become apparent from a reading of the following detail description when taken in combination with the accompanying drawings, wherein like numerals refer to like parts:

Figure 1:
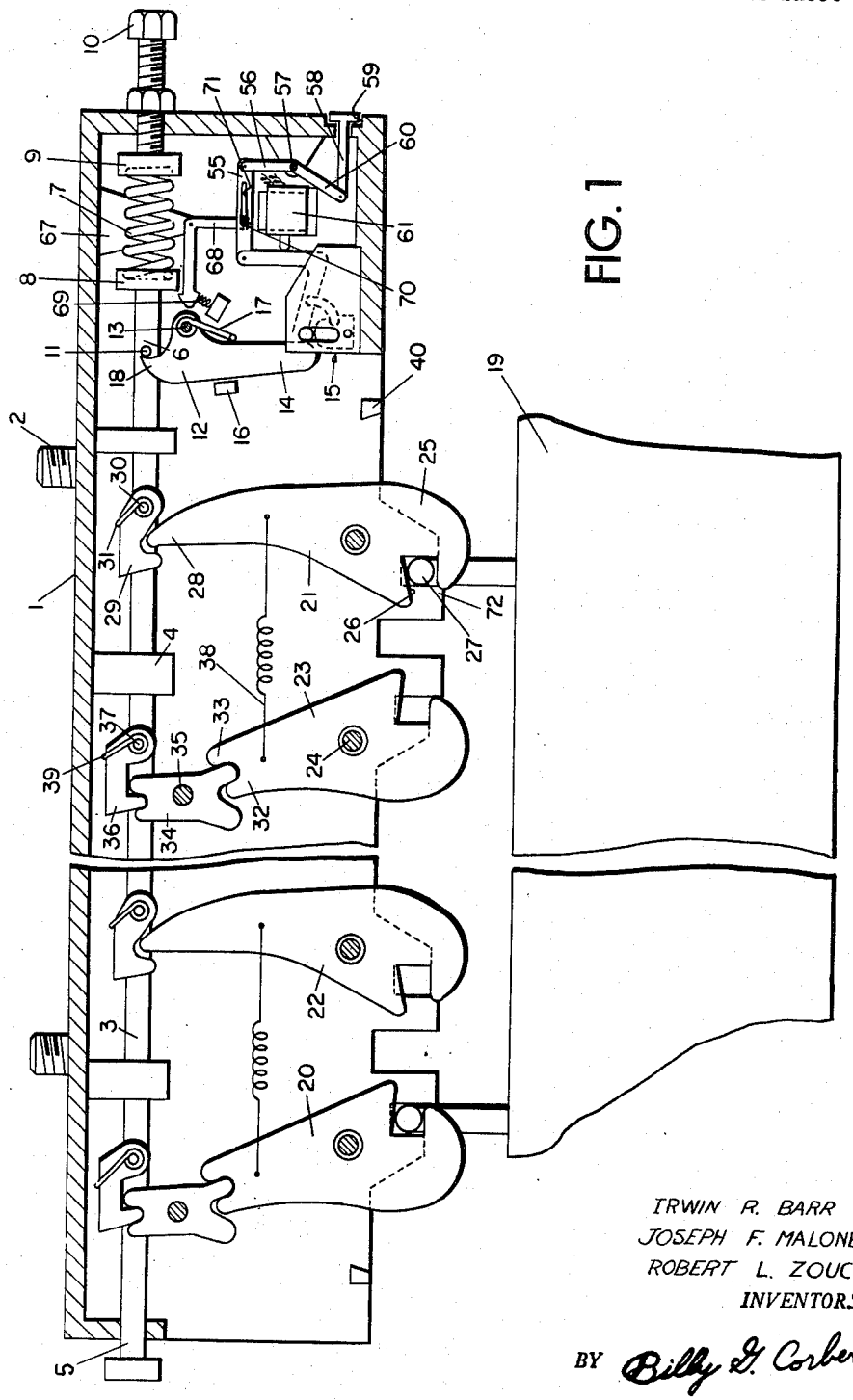
Figure 1 is a fragmentary sectional side view of the bomb rack of this invention.

The bomb rack, as shown in Figure 1, includes a box-like frame 1 having suitable means such as studs 2 for connecting the bomb rack with supporting structure such as an aircraft wing (not shown). A control rod 3 arranged longitudinally within frame 1 adjacent the upper wall thereof is carried for limited axial movement relative to the frame through suitable supports 4. One end 5 of rod 3 projects forwardly beyond frame 1. The inner end 6 of rod 3 terminates within frame 1 adjacent the opposite end thereof so as to engage a spring 7 coaxially aligned with rod 3. Spring 7 acts between a seating member 8 carried by rod 3 and a second seating member 9 carried by frame 1 through a bolt 10 so as to urge the control rod into a forwardmost axial position. The force exerted by spring 7 may be regulated by simply turning bolt 10 which threadedly engages the frame. A pin 11 formed rigid with rod 3 adjacent end 6 is arranged to engage a latch 12 swingably carried by frame 1 through pin 13 when the rod is in the axial position shown. An arm 14 formed integral with latch 12 extends downwardly to engage release mechanism 15 which controls the actuation of the latch as hereinafter described. Clockwise rotation of latch 12, as viewed in Figure 1, is limited by suitable means such as projection 16 secured to frame 1. A light spring 17 carried by pin 13 normally urges latch 12 into engagement with projection 16. By holding latch 12 in the position shown in Figure 1 so that pin 11 engages the hook end 18 of the latch, control rod 3 is prevented from moving axially forwardly. By allowing latch 12 to rotate in a counterclockwise direction, as viewed in Figure 1, pin 11 will disengage the latch and allow the control rod to move axially forwardly for releasing the bomb 19.

Two pairs of bomb supporting hooks 20 and 21, and 22 and 23 are swingably carried by frame 1 through pins 24 so that the weight of a bomb will tend to unlock the rack. Hooks 20 and 21 are provided for carrying large bombs while hooks 22 and 23 are for smaller bombs. The lower ends 25 of hooks 20 and 21 and 22 and 23 project below frame 1 and are provided with suitably shaped notches 26 for engaging lugs 27 provided on bomb 19. Notches 26 on hooks 20 and 23 are formed in the rearward edges thereof and notches 26 formed in hooks 21 and 22 are formed in the forward edges thereof so that the notches in each pair of hooks will most effectively secure the bomb to the rack. The hooks are so pivoted that should the bomb and rack become inverted the hooks will tend to rotate so as to increase their grip on lugs 27. Slotted projections 72, carried by frame 1 and associated with each hook 20, 21, 22 and 23, receive lugs 27 to resist all fore and aft loads imposed by bomb 19. Thus only loads normal to the fore and aft loads are applied to the hooks.

The upper end 28 of each hook 21 and 22 is arranged to engage a pawl 29 carried by rod 3 through pin 30. So long as hooks 21 and 22 are engaged with their respective pawls 29 they are restrained against rotation in the counterclockwise direction, as viewed in Figure 1. Each pawl 29 is urged by means of spring 31 into a position engaging hook 21 or 22 as shown in the drawing.

The upper end 32 of each hook 20 and 23 is bifurcated to provide tooth-like members 33 for engaging a bifurcated idler arm 34 pivotally carried by frame 1 through pin 35. Arm 34 is arranged to engage pawl 36 pivotally carried by rod 3 through pin 37 so as to be restrained against rotation so long as rod 3 remains in the axial position shown in Figure 1. Pawl 36 is urged into engagement with arm 34 by means of spring 39. Rotation of arm 34 in the counterclockwise direction as viewed in Figure 1 causes the hook to rotate so as to release bomb 19. Positive bomb release action by the pair of hooks 20 and 21, and 22 and 23 is assured upon allowing rod 3 to move axially forwardly from the locking position shown in the drawing by arranging the hook supporting pin 24 of each hook relative to notch 26 so that the weight of the bomb itself urges the hook to the bomb releasing position. Suitable stop means such as projection 40 secured to frame 1 limits the movement of the hooks so that they will rotate only far enough to release the bomb. To prevent the hooks from swinging freely after dropping a bomb, tension springs 38 are employed which act between hooks 20 and 22, and between hooks 21 and 23 causing them to remain against their respective stops until manually swung into the locked position as hereinafter described.

Figure 2:
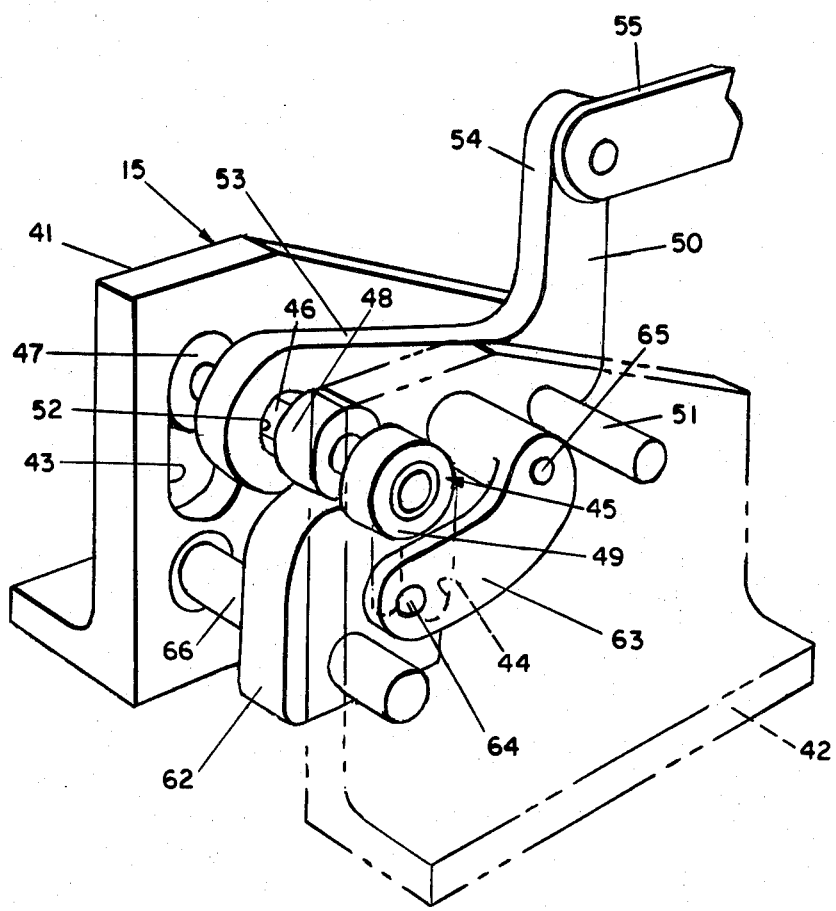
Figure 2 is a fragmentary three dimensional view of the release mechanism.

Release mechanism 15 as best shown in Figure 2 includes a pair of spaced plate-like brackets 41 and 42 rigidly carried by frame 1. A pair of cam slots 43 and 44 are formed in brackets 41 and 42 for supporting a roller lock arrangement 45 for guided movement from a position engaging arm 14 of latch 12 to a position out of engagement with the arm for releasing the latch and allowing axial forward movement of control rod 3. Roller lock assembly 45 includes a shaft 46 and three rollers 47, 48 and 49 mounted for independent rotation relative to the shaft. Rollers 47 and 49 are arranged to ride in slots 43 and 44 respectively while roller 48 is arranged to engage latch arm 14 when the roller assembly is in the upper position relative to the slots as shown in Figures 1 and 2. A bellcrank 50 pivotally carried by brackets 41 and 42 through shaft 51 loosely engages shaft 46 through a cam-like opening 52 formed in one arm 53 of the bellcrank whereby pivotal motion of bellcrank 50 about shaft 51 will cause roller assembly 45 to move within slots 43 and 44. Arm 54 of bellcrank 50 connects with one end of a link 55. The opposite end of link 55 pivotally connects with a lever 56 swingably carried by frame 1 through pin 57 as shown in Figure 1. A push rod 58 extending through opening 59 in frame 1 connects with the free end 60 of lever 56. When bellcrank 50 is caused to pivot in a counterclockwise direction as viewed in Figure 1 for releasing latch 12, lever 56 is caused to pivot about pin 57 to cause push rod 58 to move axially outwardly from frame 1 through opening 59 for re-cocking the rack after dropping a bomb as hereinafter described. Suitable means such as motor 61 carried by frame 1 is arranged to engage bellcrank 50 and effect movement thereof for releasing the latch.

To positively lock roller assembly 45 in the position engaging arm 14 a cam-like lock member 62 swingably carried by brackets 41 and 42 through shaft 66 is arranged to engage the underside of roller 48 and prevent movement of the roller assembly within slots 43 and 44 from the latch locking position shown. Movement of lock member 62 from the locking position to a position allowing roller assembly 45 to move within slots 43 and 44 is effected by a link 63 which connects at one end with member 62 through pin 64 and at its opposite end with arm 53 of bellcrank 50 through pin 65 so that as bellcrank 50 is rotated, member 62 is caused to swing rearwardly and out of engagement with the roller assembly.

A bracket 67 on frame 1 swingably carries a latch 68 arranged to engage spring seating member 8 on the inner end 6 of rod 3 and prevent axial forward movement of the rod when loading a bomb on the rack as hereinafter described. A spring 69, suitably arranged relative to latch 68 normally urges it in a clockwise direction as viewed in Figure 1, for engaging seating member 8. Pin 70 carried by latch 68 engages a slot 71 formed in link 55 so that when roller assembly 45 is in the locked position, latch 68 is held out of engagement with seating member 8 and when bellcrank 50 is pivoted to release latch 12 and allow axial forward movement of rod 3, latch 68 swings to a position where it may engage seating member 8.

To drop a bomb carried by the rack, motor 61 is energized to push bellcrank 50 and effect rotation thereof to swing lock member 62 out of engagement with roller assembly 45 and simultaneously move the roller assembly downwardly within slot 43 for disengaging arm 14 and allowing latch 12 to swing about its pivot 13. The weight of the bomb in addition to the force exerted by spring 7 causes axial forward movement of control rod 3. As the control rod moves forwardly hooks 20, 21, 22 and 23 are released and allowed to rotate to release the bomb. After releasing the hooks they are held against stops 40 by springs 38.

In cocking the rack for loading a second bomb, control rod 3 is moved rearwardly against the action of spring 7 by manually pushing on end 5 of rod 3 which projects beyond the frame. As rod 3 is pushed slightly beyond the normal rearward position shown in Figure 1 latch 68 engages spring seating member 8 and prevents rearward movement of the rod. Then push rod 58, which was moved outwardly from frame 1 when releasing the first bomb, is pushed back into the position shown in Figure 1 whereby the bell crank is swung about shaft 51 to raise roller assembly 55 into engagement with arm 14 of latch 12. Lock member 62, connected to the bellcrank through link 63, is automatically moved into engagement with the underside of roller 48 to resist any forces applied by arm 14 of latch 12 tending to unlock the release mechanism. Spring 17 carried by pin 13 urges latch 12 to a position abutting projection 16 when there is no load applied to it through pin 11 so that arm 14 is in position to be properly locked by roller assembly 45 without first manually positioning the latch. When bellcrank 50 is moved to the locked position, latch 68 is caused to release rod 3 by means of the pin 70 and slot 71 arrangement hereinbefore described. After control rod 3 is locked in its proper axial position shown in Figure 1, hooks 20, 21, 22 and 23 are swung into engagement with their respective pawls carried by the control rod while the bomb is supported so that its lugs 27 will engage notches 26 formed in the particular pair of hooks. With the hooks engaging the control rod and the control rod locked against axial movement by means of release assembly 15, the rack provides positive support for the bomb. To again release the bomb rack it is only necessary to energize motor 61 and apply force to the bellcrank urging it to swing so as to move the roller assembly out of engagement with arm 14.

The elimination of a past dead center type of lock materially reduces the force required to actuate the release mechanism and the employment of the roller assembly to eliminate sliding friction maintains the actuating force substantially constant irrespective of the bomb weight.

Although a specific arrangement has been shown and described it is to be understood that certain alterations, modifications and substitutions may be made without departing from the spirit and scope of this invention as defined by the appended claims.

We claim:

1. A bomb rack for aircraft comprising, a frame, a control rod carried by said frame for limited axial movement relative thereto, spring means urging said rod into an extreme axial position, a projection carried by said rod adjacent one end thereof, a latch swingably carried by said frame and arranged to engage said projection of locking said rod against the action of said spring means, a bracket carried by said frame and having a slot formed therein, a generally cylindrical roller carried within said slot so as to lockingly engage said latch in one position relative to said slot and to move free of said latch in a second position relative to said slot, a bellcrank pivotally carried by said bracket, one arm of said bellcrank having an opening formed therein for engaging said roller whereby pivotal movement of said bellcrank will cause said roller to move within said bracket slots for locking and unlocking said latch, lock means pivotally carried by said bracket and operatively connecting with said bellcrank for automatically locking said roller against movement within said slot in one position of said bellcrank and for allowing movement thereof within said slot in other positions of said bellcrank, a plurality of hooks swingably carried by said frame, and pawl means pivotally carried by said rod for releasably engaging said hooks whereby to support a bomb, said pawl means being responsive to axial movement of said rod from the locked position for releasing said hooks and dropping said bomb.

2. A rack for releasably carrying bombs and the like comprising, a frame, a control rod slidably carried by said frame for limited axial movement relative thereto, a plurality of bomb supporting hooks swingably carried by said frame, means pivotally carried by said control rod for restraining said hooks against movement relative to the rod, a latch carried by said frame and arranged to releasably engage said rod and hold it in a fixed position relative to said frame whereby to prevent movement of said hooks from a bomb supporting position, bracket means carried by said frame, a roller assembly carried by said bracket means for guided movement from a latch locking position abutting said latch to a latch releasing position spaced from the latch, lever means carried by said bracket and engaging said roller assembly for controlling the movement thereof relative to said bracket, and roller lock means operatively connected to said lever means for engaging said roller assembly to prevent movement thereof in the locking position only.

3. A rack for releasably carrying bombs and the like comprising, a frame, a control rod slidably carried by said frame for limited axial movement relative thereto, a plurality of bomb supporting hooks swingably carried by said frame, means pivotally carried by said control rod for restraining said hooks against movement relative to the rod, a latch carried by said frame and arranged to releasably engage said rod and hold it in a fixed axial position relative to said frame whereby to prevent movement of said hooks from a bomb supporting position, a pair of spaced brackets carried by said frame and having slots formed therein, a roller assembly carried by said pair of brackets within said slots for guided movement from a latch locking position abutting said latch to a latch releasing position spaced from the latch, said roller assembly including a roller independently rotatable relative thereto for engaging said latch in said latch locking position whereby to maintain only rolling friction between said latch and assembly, lever means engaging said roller assembly for controlling the movement thereof relative to said slots, and roller lock means operatively connected to said lever means for engaging said roller assembly to prevent movement thereof in the locking position only.

4. A rack for releasably carrying bombs and the like comprising, a generally rectangular frame, a longitudinally arranged control rod slidably carried by said frame for limited axial movement relative thereto, a plurality of hooks swingably carried by said frame for movement between an object supporting position and an object releasing position, a latch swingably carried by said frame for releasably engaging said rod to hold it in an extreme axial position relative to said frame, means pivotally carried by said rod for holding said hooks in said object supporting position only when said rod is in said extreme axial position, lock means carried by said frame for releasably securing said latch in position engaging said rod and holding the latter in said extreme axial position, said lock means including a roller assembly carried by said frame for guided movement from a latch locking position abutting said latch to a latch releasing position spaced from the latch, and lever means carried by said frame for engaging said roller assembly and controlling to movement thereof relative to said frame.

References Cited in the file of this patent

UNITED STATES PATENTS

| | | |
|---|---|---|
| 1,500,973 | Wearham | July 8, 1924 |
| 1,812,759 | Slinde | June 30, 1931 |
| 2,278,482 | Pishovanov | Apr. 7, 1942 |
| 2,548,053 | Pierson | Apr. 10, 1951 |
| 2,571,381 | Potter | Oct. 16, 1951 |

FOREIGN PATENTS

| | | |
|---|---|---|
| 300,184 | Germany | June 10, 1919 |
| 367,332 | Germany | Jan 19, 1923 |
| 16,734 | Holland | Sept. 15, 1927 |